Sept. 17, 1957  R. D. JAMES ET AL  2,806,293
CALIBRATION APPARATUS FOR THREADED PARTS
Filed Nov. 16, 1953
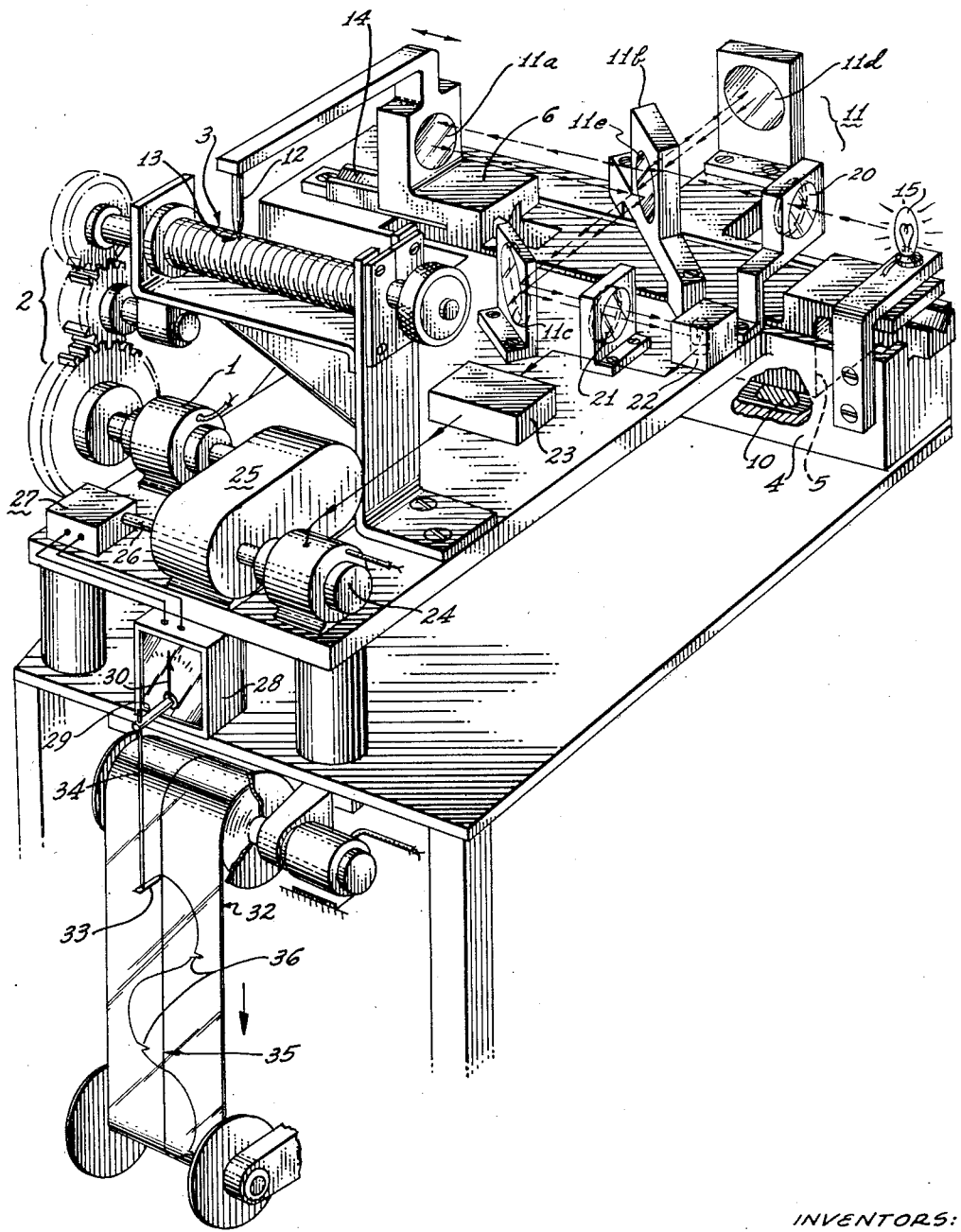
INVENTORS:
RICHARD. D. JAMES
GEORGE E. OPPEL
DANIEL L. DENNIS
By Hubert E. Metcalf
Their Patent Attorney

United States Patent Office 2,806,293
Patented Sept. 17, 1957

2,806,293

CALIBRATION APPARATUS FOR THREADED PARTS

Richard D. James, Manhattan Beach, George E. Oppel, Los Angeles, and Daniel L. Dennis, Inglewood, Calif., assignors to Northrop Aircraft, Inc., Hawthorne, Calif., a corporation of California Application November 16, 1953, Serial No. 392,442

4 Claims. (Cl. 33—199)

My invention relates to error recording means and more particularly to that type employing a light interference pattern to detect errors.

An illustration of the need for my invention occurs in the manufacture of accurately threaded lead screws to be used in diffraction grating ruling engines. The screws are subject to errors such as a progressive pitch error, a cyclic error, those resulting from errors in the gears cutting the screw, and from temperature variation. In order to correct for these inaccuracies in the fabricating machines, it must first be ascertained where the error is occurring, i. e., which place or places on the screw. Since time is usually an important factor, mechanical measuring means, which may take as long as two days, are decidedly unsatisfactory. It is possible with my invention to measure to $1/100,000$ of an inch on the screw and thus very accurately determine where the fabricating machines are causing errors in forming the screw thread. The time expenditure necessary to measure these errors is relatively short, in the order of minutes, and hence is a tremendous advancement over the mechanical measuring means previously generally employed.

It is therefore a general object of my invention to provide a rapid error recorder means.

A further object of my invention is to provide an electro-optical error recorder means which is both rapid and extremely accurate.

A more specific object of my invention is to provide an electro-optical error recorder which is effective to indicate the place or places on the component tested where the error occurs and the magnitude thereof.

Other objects and uses will manifest themselves to those skilled in the art in view of the subsequent disclosure and drawing wherein the figure is a perspective view of my invention showing a lead screw being tested for accuracy thereon.

For a detailed description of my invention, reference is made to the drawing. A first synchronous motor 1 or any other driving means within the scope of the alternation characteristics of a driven means or synchronous motor 1, actuates a gear train 2 to which a part to be tested, in my embodiment a lead screw 3, is secured and rotated thereby. An elongated table 4, having a centrally located recessed portion 5 extending substantially to both ends, supports a movable carriage 6 buoyantly seated in a pool of mercury 10 placed within the recessed portion 5 of the table 4. An interferometer 11, preferably of the Twyman-Green type, is set up on the table 5 so that a mirror 11a is movable with the carriage 6. A stylus 12 rides within the grooves 13 of the lead screw 3 and is secured to the carriage 6 so that movement of the stylus 12 within the grooves 13 will result in concomitant movement of the carriage 6. Thus as the lead screw 3 is caused to rotate, the carriage 6 is simultaneously moved along its guide rails 14. A monochromatic light source 15 is directed through a collimating lens 20 and then directed to an angularly positioned light splitting plate 11b. The plate 11b is thinly silvered on one side 11e to result in a semi-reflecting surface. Half of the light from the source 15 passes through the plate 11b onto the movable mirror 11a. The light is then reflected back to the plate 11b and thence onto an angularly positioned mirror 11c. The other half of the light is reflected to a stationary mirror 11d positioned perpendicularly to the movable mirror 11a and then back to the plate 11b from which it is passed through to the angularly positioned mirror 11c. Due to the fact that the movable mirror 11a is gradually causing one of the optical paths to change the phase relationship of the two portions of the light when reflected upon the angular mirror 11c, the resultant intensity of the light striking the angularly positioned mirror will constantly vary, either being reinforced or diminished. The resultant light intensity on the angularly positioned mirror 11c is then directed through a second collimating lens 21 and then to a photoelectric cell 22 which transforms the changes in light intensity into electrical pulses. These pulses are then fed into an amplifier 23 and then to a second synchronous motor 24, both motors 1 and 24 are connected by a differential gear 25 intermediately located with respect thereto.

Any variation in speed between the motors 1 and 24 is registered in the differential gear 25 which in turn is connected to the potentiometer shaft 26 of a potentiometer 27. The shaft 26 is therefore caused to rotate in accordance with the output of the differential gear 25, the potentiometer 27 acting as a voltage divider for an independent voltage source. The voltage output from the potentiometer 27 is fed into a voltmeter 28, which has a small outwardly protruding shaft 29 which rotates along with the indicator needle 30 of the voltmeter 28. The recorder 32 has marking means 33 connected to the shaft 29 by a rigid rod 34. Thus, where no output exists in the differential gear 25, the pointing means 33 will move along the null line 35. Rotation of the shaft 26 will alter the voltage input to the recorder 32 from the potentiometer 27 and cause the pointing means 33 to go above or below the null line 35 in proportion to the voltage variation from the no output voltage.

The gear train 2 is so arranged that a perfect lead screw 3 will cause one pulse at the photo cell 22 for every revolution of the input motor 1. This in turn will result in one revolution of the second synchronous motor 24 when the electrical pulse is amplified and directed thereto. The recorder 32 may be adjusted to provide markers or spikes 36 to indicate each revolution of the lead screw 3. Where the tested element, here the lead screw 3, is inaccurate or faulty, the pulses from the photo cell 22 will not drive the second motor 24 at the same speed as the first motor 1, thus causing the marking means 33 to vary from the null line 35. From this data, the magnitude of the error and the portion of the fabricating machine responsible for the error may readily be deduced.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a calibration apparatus for threaded parts and having photoelectric, interferometric and recording elements, operating means comprising: a first constant speed motor rotating a threaded part to be calibrated and simultaneously effecting a corresponding movement of an element of the interferometer to obtain a pulse output from said photoelectric element; means amplifying said pulse output; a second motor energized by said amplified pulse output; a differential device having one element driven by said first motor, a second element driven by said second motor, and a third element driven as a function of any difference in speed of said first and second elements of the differential device; and recording means controlled by the movement of said third element of the differential device to produce a continuous line record of deviations from accuracy of the part being calibrated.

2. A calibration device as set forth in claim 1 and including a stylus riding in the thread of said threaded part to operate interferometer and photoelectric elements to effect the emission of a continuous series of pulses to thereby obtain a continuous line record of inaccuracies in the thread of said threaded part.

3. A calibration device as set forth in claim 2 and in addition comprising gearing arranged between said first constant speed motor rotating said threaded part and said part, said gearing being proportioned to the movement of an interferometer element so that one output pulse for each revolution of said threaded part is generated by said photoelectric element.

4. In a calibration apparatus for threaded parts and having photoelectric, interferometric and recording elements, operating means comprising: a first constant speed motor rotating a threaded part to be calibrated and simultaneously effecting a corresponding movement of an element of the interferometer to obtain a pulse output from said photoelectric element; means amplifying said pulse output; a second motor energized by said amplified pulse output; a differential device having one element driven by said first motor, a second element driven by said second motor, and a third element driven as a function of any difference in speed of said first and second elements of the differential device; a potentiometer and voltmeter connected in an electric circuit; said potentiometer being controlled by difference between the speeds of the said differential elements to effect displacement of the indicating element of said voltmeter; a third motor driven independently of said first and second motors; sheet material continuously moved in one direction by said third motor; and marking means moved by movements of the indicator of said voltmeter to form a continuous line record on said sheet material showing deviations in accuracy of the part being calibrated.

References Cited in the file of this patent

UNITED STATES PATENTS

| | | |
|---|---|---|
| 2,606,092 | Rich | Aug. 5, 1952 |
| 2,666,267 | Root | Jan. 19, 1954 |